(12) United States Patent
Okada et al.

(10) Patent No.: US 8,485,155 B2
(45) Date of Patent: Jul. 16, 2013

(54) INTERNAL COMBUSTION ENGINE

(75) Inventors: Nozumi Okada, Wako (JP); Kazuhiro Ikeda, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 703 days.

(21) Appl. No.: 12/644,527

(22) Filed: Dec. 22, 2009

(65) Prior Publication Data
US 2010/0186706 A1 Jul. 29, 2010

(30) Foreign Application Priority Data
Jan. 29, 2009 (JP) .................................. 2009-017533

(51) Int. Cl.
*F02B 75/06* (2006.01)
(52) U.S. Cl.
USPC ................. 123/192.2; 123/196 R; 123/90.37; 123/188.6
(58) Field of Classification Search
USPC ..................... 123/192.2, 196 R, 90.37, 188.6
See application file for complete search history.

(56) References Cited

U.S. PATENT DOCUMENTS
7,395,804 B2 * 7/2008 Takemoto et al. ........ 123/196 R

FOREIGN PATENT DOCUMENTS
JP 2007-291950 11/2007

* cited by examiner

*Primary Examiner* — Lindsay Low
(74) *Attorney, Agent, or Firm* — Squire Sanders (US) LLP

(57) ABSTRACT

An internal combustion engine can comprise a crankcase, and a crankshaft rotatably supported in the crankcase. The crankshaft includes a drive sprocket attached thereto. A cam chain engages the drive sprocket, and a cam chain chamber houses at least a part of the drive sprocket and cam chain therein. The cam chain chamber is configured to pool oil in a lower portion thereof. A balancer is coupled to the crankshaft and is configured to be rotated by rotational power transmitted from the crankshaft. The balancer is also disposed within the cam chain chamber, and is configured to splash oil pooled in the cam chain chamber during the rotation thereof. The engine also comprises a wall portion disposed in the cam chain chamber. The wall portion is configured to cover an upper portion of the balancer, and is disposed adjacent to a periphery of the balancer.

9 Claims, 5 Drawing Sheets

INTERNAL COMBUSTION ENGINE

BACKGROUND

1. Field

The present invention relates to internal combustion engines. In particular, engines having pooled oil and which rely, at least in part, on internal lubrication at least in part

2. Description of the Related Art

An internal combustion engine having the following structure is known from Japanese Patent Publication No. 2007-291950 (Japan '950). Specifically, in the internal combustion engine, a cam chain chamber which houses a drive sprocket and a part of a cam chain wound around the drive sprocket, is formed between a crankcase and a cover which is connected to the crankcase and covers a side of the crankcase. The cam chain chamber is formed also to be capable of pooling oil in a lower portion thereof. In addition, a balancer is housed in the cam chain chamber and arranged at a position where the balancer is capable of splashing the oil pooled in the lower portion inside the cam chain chamber.

Meanwhile, the oil pooled in the lower portion of the cam chain chamber is sucked in by an oil pump, and then is supplied from the oil pump to a lubricating portion of the internal combustion engine. When oil splashed by the rotation of the balancer falls down on an oil sump, bubbles are generated in the oil in the oil sump. As a result, air is likely to be mixed into the oil which is to be sucked by the oil pump.

SUMMARY

In one embodiment, an internal combustion engine includes a crankcase and a crankshaft rotatably supported in the crankcase. The crankshaft includes a drive sprocket attached thereto. A cam chain engages the drive sprocket, and a cam chain chamber houses at least a part of the drive sprocket and cam chain therein. The cam chain chamber is configured to pool oil in a lower portion thereof. A balancer is coupled to the crankshaft and is configured to be rotated by rotational power transmitted from the crankshaft. The balancer is also disposed within the cam chain chamber, and is configured to splash oil pooled in the cam chain chamber during the rotation thereof. The engine also includes a wall portion disposed in the cam chain chamber, with the wall portion configured to cover an upper portion of the balancer. The wall portion is disposed is adjacent to a periphery of the balancer.

In another embodiment, the wall portion can include a cutout therein, with the cutout configured to discharge oil between the balancer and the wall portion therethrough.

In other embodiments, the cutout can be disposed above an uppermost portion of a rotational trajectory of an outermost periphery of the balancer.

The crankcase can include a pair of case halves connected to each other at a matching interface along a plain orthogonal to an access of the crankshaft. At least one of a plurality of bolts fastening the case halves together are configured so as to partially to meet the cutout.

A guide supporting portion can be formed integrally on the crankcase adjacent side of the balancer, wherein the guide supporting portion is recessed in a J shape into which at an end portion of a cam chain guide, guiding the cam chain is supported. The wall portion can be formed integrally on the crankcase so as to be continuously connected to the guide supporting portion.

According to embodiments of the invention, the balancer is covered at least from above by the wall portion adjacent to the outer periphery of the balancer. Accordingly, the oil splashed by the rotation of the balancer is caused to hit the wall portion, thereby being collected. The oil thus collected falls in drops from the wall portion, so that babbles are unlikely to be generated in the oil. As a result, air is unlikely to be mixed into the oil which is to be sucked in by an oil pump.

In some embodiments of the invention, a part of oil pooled between the balancer and the wall portion is discharged through the cutout to the side of the wall portion, so that the rotational friction of the balancer can be reduced.

According to another embodiment, the cutout is arranged above the uppermost portion of the rotational trajectory of the outermost periphery of the balancer. Accordingly, the oil splashed by the balancer can be prevented from reaching directly the cutout and then coming out to the side of the wall portion.

In some embodiments, at least one of the plurality of bolts with which the pair of case halves are fastened to each other is arranged in such a manner as to partially meet the cutout. Accordingly, the flexibility in the layout of the bolt can be enhanced with the wall portion not interfering with the layout of the bolt.

Furthermore, according to some embodiments, the wall portion is provided integrally on the crankcase in such a manner as to be continuously connected to the guide supporting portion into which an end portion of the cam chain guide is fitted to be supported. Accordingly, the guide supporting portion is provided with the function to collect the oil splashed by the balancer, whereby the effect of collecting oil can be enhanced.

DETAILED DESCRIPTION OF THE PREFERRED EMBODIMENTS

Hereinafter, embodiments of the present invention will be described in detail on the basis of the accompanying drawings.

Figure 1:
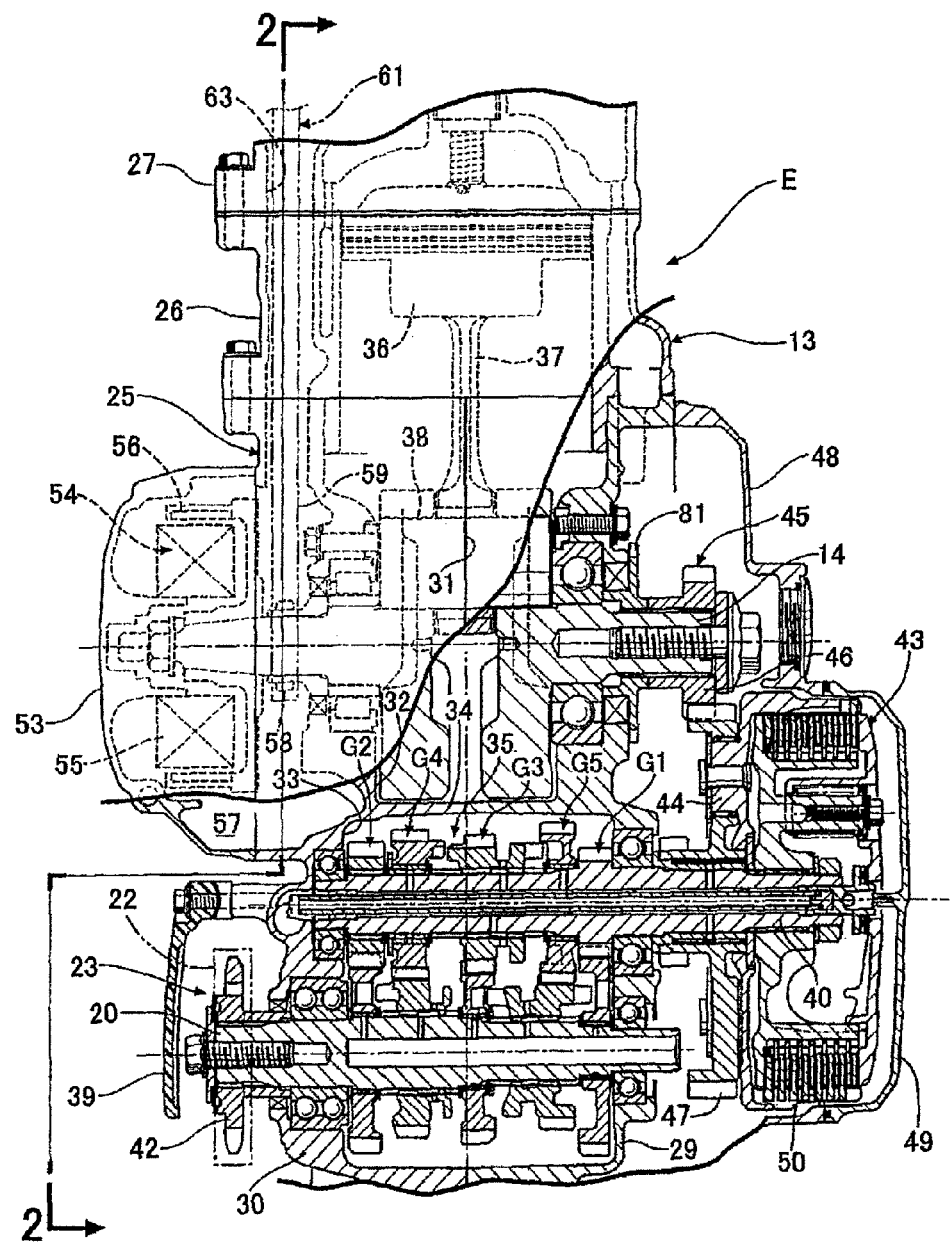
FIG. 1 is a vertical cross-sectional side view of essential parts of an internal combustion engine according to an embodiment of the invention.

With reference to FIG. 1 to FIG. 5, Embodiment 1 of the present invention will be described. In FIG. 1, an engine main body 13 of a single-cylinder four-cycle internal combustion engine E is mounted on a motorcycle in such a manner that an axis of a crankshaft 14 is aligned in a right-left direction of the motorcycle. The internal combustion engine E includes an output shaft 20 protruding to the left of a rear portion of the engine main body 13. Transmission 23, which can include an endless chain 22, is provided between an outer end portion of the output shaft 20 and an axle (not illustrated) of a rear wheel. Rotational power from the internal combustion engine E is transmitted to the rear wheel via the transmission or transmission means 23.

The engine main body 13 can include a crankcase 25, a cylinder block 26 connected to the crankcase 25, a cylinder head 27 connected to the cylinder block 26, and a head cover (not illustrated) connected to the cylinder head 27.

In this example, the crankcase 25 in which the crankshaft 14 is rotatably supported is formed of a right case half 29 and a left case half 30, which are connected to each other at a matching interface 31 along a plane orthogonal to the axis of the crankshaft 14. The right case half 29 and the left case half 30 are arranged respectively on the right and left sides when mounted on the motorcycle. Both of the case halves 29 and 30 can be formed, in this example, of an aluminum alloy. Further, a crank chamber 32 and a transmission chamber 33 are formed in the crankcase 25 while being separated from each other by a partition wall 34. The crank chamber 32 houses portions of the crankshaft 14, and the transmission chamber 33 houses a constant-mesh transmission 35.

As noted above, portions of the crankshaft 14 are housed in the crank chamber 32. A piston 36 is slidably fitted in the cylinder block 26, and a large end of a connecting rod 37 continuous with the piston 36 is coupled to the crankshaft 14 with a crankpin 38.

The transmission 35 can be made up of a plurality of speed gear trains which can be selectively established, for example, first to fifth speed gear trains G1, G2, G3, G4, and G5, provided between a main shaft 40 and the output shaft 20. The main shaft 40 has an axis parallel to the crankshaft 14 and is rotatably supported in the right and left case halves 29 and 30. The output shaft 20 has an axis parallel to the main shaft 40 and is rotatably supported in the case halves 29 and 30.

A sprocket 42 which constitutes a part of the transmission 23 is fixed on an end portion of the output shaft 20, the end portion protruding from the left case half 30. The chain 22 is wound around the sprocket 42. In addition, a sprocket cover 39 which covers the sprocket 42 is attached to the left case half 30.

In a state where the engine main body 13 is mounted on the motorcycle, the right end portions respectively of the crankshaft 14 and the main shaft 40 protrude from the right case half 29. A starter clutch 43 is mounted on the right end portion of the main shaft 40. The starter clutch 43 switches between connection and disconnection of power between the crankshaft 14 and the main shaft 40. The rotational power of the crankshaft 14 is transmitted to an input member 44 of the starter clutch 43 via a first reduction gear 45. The first reduction gear 45 is formed of a drive gear 46 and a driven gear 47. The drive gear 46 is fixed on the right end portion of the crankshaft 14. The driven gear 47 is supported on the main shaft 40 in such a manner as to be rotatable relative to the main shaft 40 while meshing with the drive gear 46. The driven gear 47 is coupled to the input member 44, which is supported on the main shaft 40 in such a manner as to be rotatable relative to the main shaft 40.

A right cover 48 can be fastened to the right case half 29 in such a manner as to cover the first reduction gear 45. The right cover 48 constitutes a part of the engine main body 13 while having an opening portion 50 through which a part of the starter clutch 43 comes out. A clutch cover 49 for covering the starter clutch 43 is fastened to the right cover 48 in such a manner as to close the opening portion 50.

Figure 2:
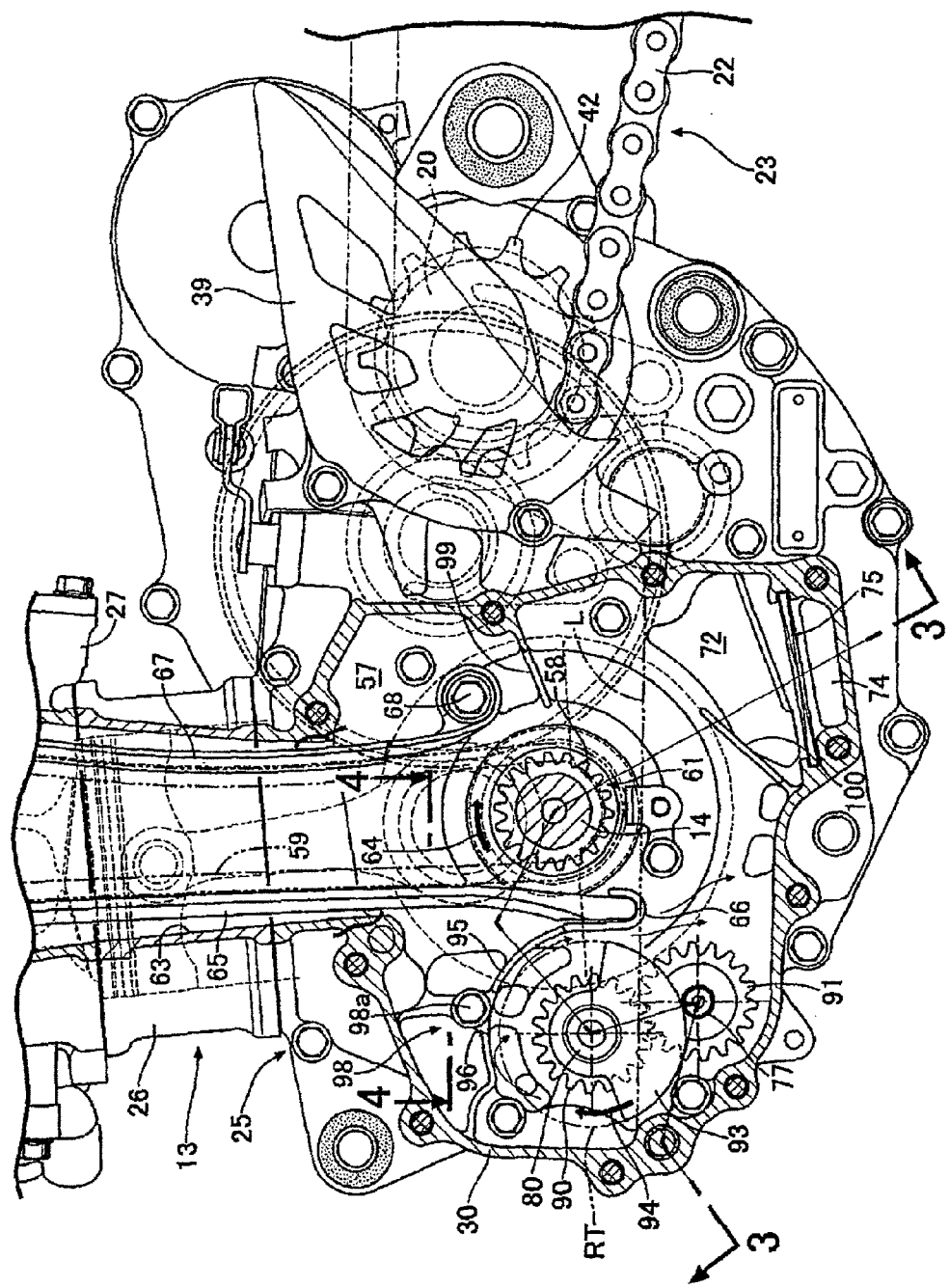
FIG. 2 is a cross-sectional view taken along the line 2-2 in FIG. 1.
Figure 3:
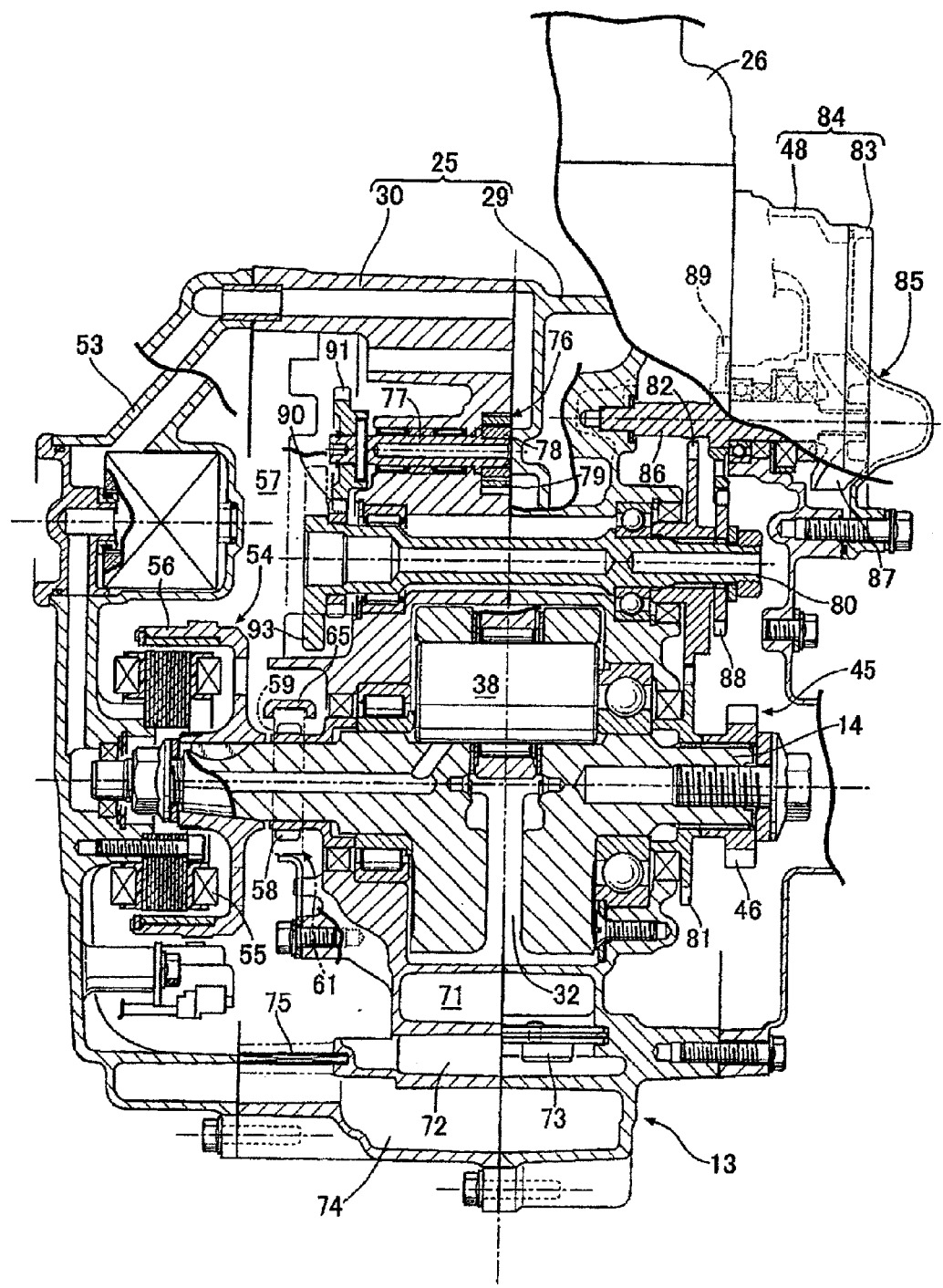
FIG. 3 is a cross-sectional view taken along the line 3-3 in FIG. 2.

Referring to FIG. 2 and FIG. 3, in the state where the engine main body 13 is mounted on the motorcycle, the left end portion of the crankshaft 14 protrudes from the left case half 30. A rotor 56 is fixed on the left end portion of the crankshaft 14. A stator 55 is fixed in an electric-generator cover 53 which is fastened to the left case half 30 while constituting a part of the engine main body 13. The stator 55 and the rotor 56 constitute an electric generator 54.

A cam chain chamber 57 is formed between the left case half 30 of the crankcase 25 and the electric-generator cover 53. A drive sprocket 58 is fixed on the crankshaft 14 at a position inside the cam chain chamber 57. An endless cam chain 59 is wound around the drive sprocket 58 while a part of the cam chain 59 is housed in the cam chain chamber 57. A driven sprocket (not illustrated) is fixed on a cam shaft (not illustrated) rotatably supported in the cylinder head 27 while the cam chain 59 is wound around the driven sprocket. The drive sprocket 58, the cam chain 59, and the driven sprocket constitute a timing transmission system 61 which transmits the rotational power of the crankshaft 14 to the cam shaft while reducing the rotational speed thereof by ½. A cam chain passage 63 is formed in the cylinder block 26 and the cylinder head 27 in such a way as to allow the cam chain 59 to run therethrough. The cam chain passage 63 extends in the up-down direction with a lower end portion thereof communicating with the cam chain chamber 57.

The crankshaft 14 and the drive sprocket 58 each rotate in a direction indicated by the arrow 64 in FIG. 2. Such a rotation of the drive sprocket 58 causes the cam chain 59 to run between the drive sprocket 58 and the driven sprocket. A cam chain guide 65 guides the cam chain 59 at the tension side thereof. A guide supporting portion 66 into which an end portion of the cam chain guide 65 is fitted to be supported is formed integrally on the left case half 30 of the crankcase 25. The guide supporting portion 66 has a shape recessed in a substantially "J" shape.

Moreover, a tensioner 67 is rotatably supported at an end portion thereof on the left case half 30 of the crankcase 25 by means of a spindle 68. The tensioner 67 is designed to come into contact with the outer periphery of the cam chain 59 at the slack side thereof, and to thereby tension the cam chain 59. The other end side of the tensioner 67 is resiliently biased toward the cam chain 59 by a tensioner lifter (not illustrated) attached to the cylinder head 27.

Referring to FIG. 3, a first oil sump 71 communicating with a lower portion of the crank chamber 32 is formed in a lower portion of the crankcase 25. In addition, a second oil sump 72 and a third oil sump 74 are formed in the lower portion of the crankcase 25 and the lower portion inside the cam chain chamber 57. A reed valve 73 designed to open and close in accordance with a variation in pressure inside the crank chamber 32 is interposed between the first oil sump 71 and the second oil sump 72. An oil strainer 75 is interposed between the second oil sump 72 and the third oil sump 74. The inside of the second oil sump 72 is open to the atmosphere via an unillustrated breather passage, so that the pressure inside the second oil sump 72 is equal to the atmospheric pressure. In addition, the reed valve 73 is sandwiched and held between the right case half 29 and the left case half 30. Moreover, the oil strainer 75 is sandwiched and held between the left case half 30 and the electric-generator cover 53.

Oil in the third oil sump 74 is pumped up by an oil pump 76. The oil pump 76 can formed as a trochoid pump. In this example, the pump can include an inner rotor 78 fixed on an inner end of a pump shaft 77, and an outer rotor 79 meshing with the inner rotor 78. The oil pump 76 is provided between the right and left case halves 29 and 30 of the crankcase 25 in such a manner as to be disposed forward of the crankshaft 14 when the engine main body 13 is mounted on the motorcycle.

A balancer shaft 80 is rotatably supported in the right and left case halves 29 and 30 of the crankcase 25. The balancer shaft 80 has an axis parallel to the crankshaft 14 and is arranged forward of the crankshaft 14. A first drive gear 81 is provided on a protruding portion of the crankshaft 14, the protruding portion protruding from the right case half 29 while a first driven gear 82 is provided on a protruding portion of the balancer shaft 80, the protruding portion protruding from the right case half 29. The first driven gear 82 meshes with the first drive gear 81, and accordingly, the balancer shaft 80 is rotated by power transmitted from the crankshaft 14.

In addition, a water pump 85 can be arranged above the balancer shaft 80. The water pump 85 has a pump housing 84, with the right cover 48 connected to the right case half 29 from the outer side, and a pump cover 83 fastened to an outer surface of the right cover 48. In the example, the water pump 85 includes a pump shaft 86 which is parallel to the balancer shaft 80.

The pump shaft 86 can penetrate, fluid-tightly and rotatably, the right cover 48 of the pump housing 84. Rotating vanes 87 are firmly fixed coaxially on one end portion of the pump shaft 86 inserted into the pump housing 84. The pump shaft 86 is rotatably supported at the other end portion thereof by the right case half 29.

A second drive gear 88 aligned with the first drive gear 81 is fixed on a protruding portion of the balancer shaft 80, the protruding portion protruding from the right case half 29. A second driven gear 89 meshing with the second drive gear 88 is fixed on the pump shaft 86. Accordingly, the rotational power from the crankshaft 14 is transmitted also to the pump shaft 86 of the water pump 85.

A third drive gear 90 is fixed on a protruding portion of the balancer shaft 80, the protruding portion protruding from the left case half 30. A third driven gear meshing with the third drive gear 90 is fixed on a protruding end portion of the pump shaft 77 of the oil pump 76, the protruding end portion protruding from the left case half 30. Accordingly, the rotational power from the crankshaft 14 is transmitted to the pump shaft 77 of the oil pump 76 via the balancer shaft 80.

A balancer 93 arranged inside the cam chain chamber 57 is fixed on a protruding end portion of the balancer shaft 80, the protruding end portion protruding from the left case half 30. The balancer 93 rotates together with the balancer shaft 80 in a direction indicated by the arrow 94 in FIG. 2. In addition, a lower portion inside the cam chain chamber 57 forms a part of the second oil sump 72, and oil is pooled in the lower portion inside the cam chain chamber 57 as indicated by the dashed line L in FIG. 2. Meanwhile, the balancer 93 is arranged at such a position as to be able to be partially immersed into the oil pooled in the lower portion inside the cam chain chamber 57. With this arrangement, the oil pooled in the lower portion inside the cam chain chamber 57 is splashed by the balancer 93.

The oil pooled in the lower portion inside the cam chain chamber 57 is sucked in by the oil pump 76. If the oil splashed by the rotation of the balancer 93 falls into the second oil sump 72, bubbles are generated in the oil in the second oil sump 72, in turn making air likely to be mixed into the oil which is to be sucked by the oil pump 76. In this regard, a wall portion 95 covering the balancer 93 at least from above is provided integrally on the left case half 30 of the crankcase 25 in the engine main body 13 in such a manner as to be adjacent to the outer periphery of the balancer 93. In Embodiment 1, the wall portion 95 is formed in an arcuate shape to cover the balancer 93 from above.

Figure 4:
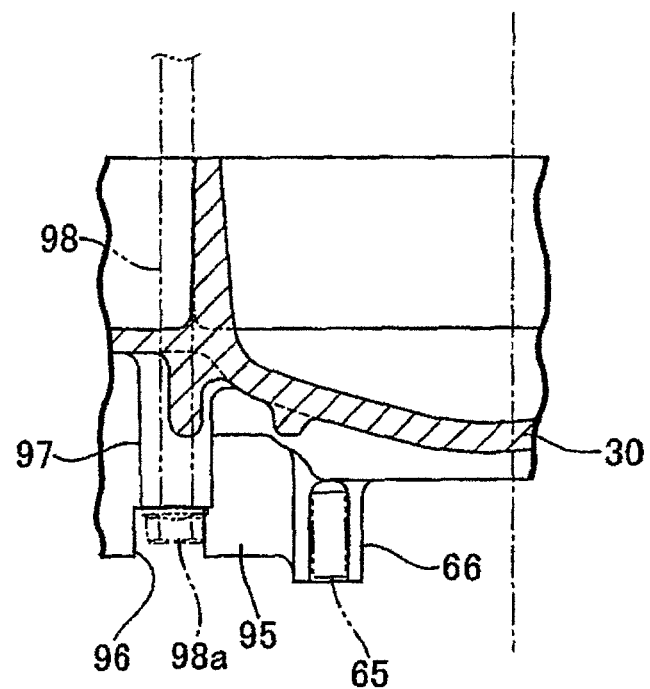
FIG. 4 is a cross-sectional view taken along the line 4-4 in FIG. 2.
Figure 5:
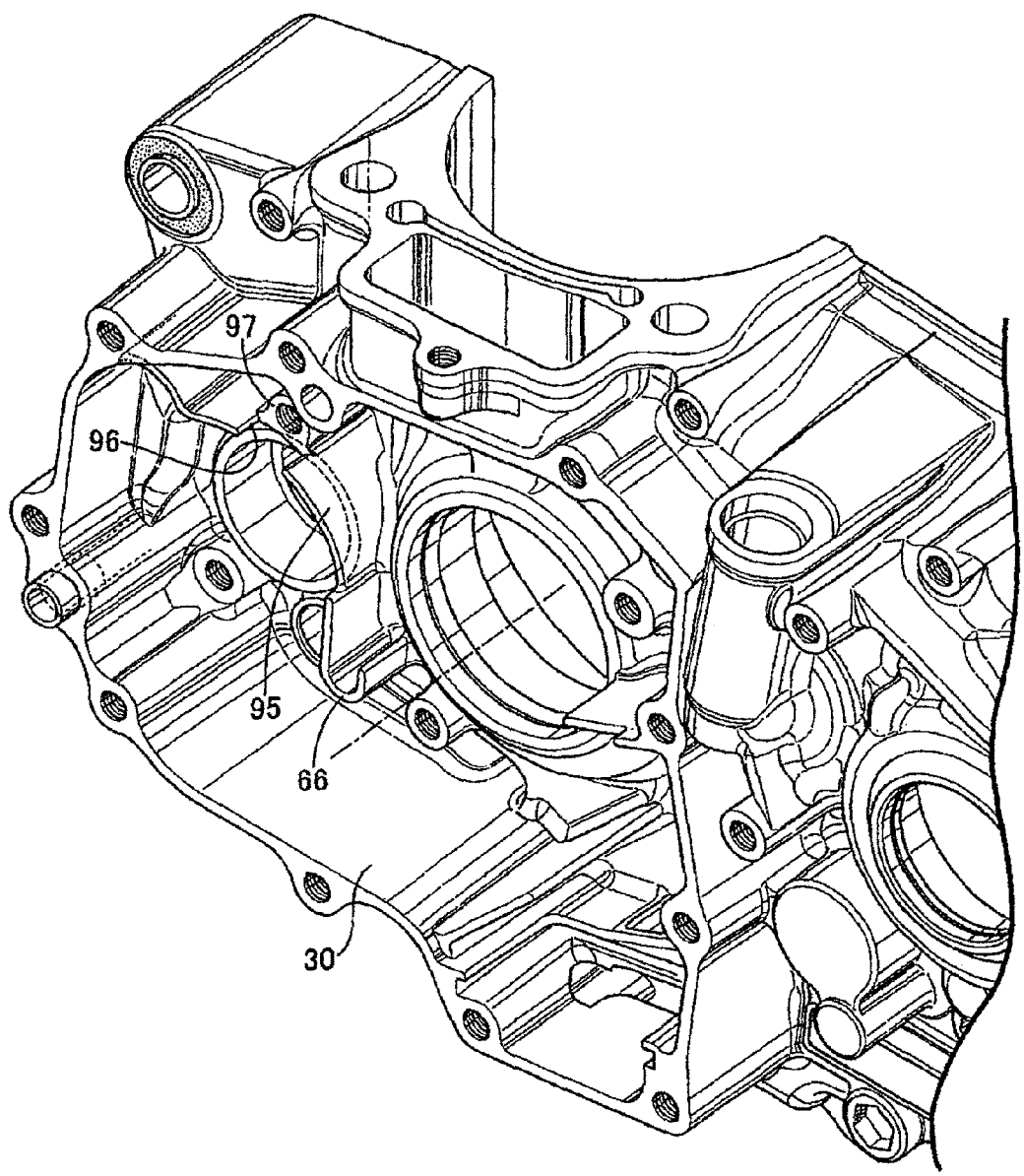
FIG. 5 is a perspective view of a left case half in accordance with an embodiment of the engine.

Referring the examples of FIG. 4 and FIG. 5, the guide supporting portion 66 recessed in the substantially "J" shape, into which the one end portion of the cam chain guide 65 is fitted to be supported, is formed integrally on the left case half 30 of the crankcase 25 at the side of the balancer 93. The wall portion 95 is formed integrally on the left case half 30 in such a manner as to be continuously connected to the guide supporting portion 66.

Moreover, a cutout 96 is provided in the wall portion 95. A part of oil pooled between the balancer 93 and the wall portion 95 is discharged through the cutout 96 to the side of the wall portion 95. The cutout 96 is provided in the wall portion 95 in such a manner as to be arranged above the uppermost portion of a rotational trajectory RT of the outermost periphery of the balancer 93.

The crankcase 25 is formed by fastening the right case half 29 and the left case half 30 to each other with a plurality of bolts. At least one of these bolts, which is a bolt 98 in Embodiment 1, is inserted through a boss portion 97. The boss portion 97 is formed integrally with the wall portion 95 in such a manner as to bulge outward from the outer periphery of the wall portion 95 at a position corresponding to the cutout 96. A part of a large-diameter head portion 98*a* of the bolt 98 inserted through the boss portion 97 is placed to meet the cutout 96.

Referring to FIG. 2, a protruding portion 99 is formed integrally on the left case half 30 in order to collect the oil splashed by the drive sprocket 58. The protruding portion 99 protrudes in a direction approaching the drive sprocket 58 at a position opposing the rotational direction 64 of the drive sprocket 58. Moreover, in this example, a baffle plate 100 is provided integrally on a lower portion of the left case half 30 in such a manner as to be interposed between the balancer 93 and the oil strainer 75. If the fluid level of oil pooled in the cam chain chamber 57 is lowered, oil waves would be generated by the rotation of the balancer 93. The baffle plate 100 is designed to prevent such oil waves from reaching the oil strainer 75 side.

Next, the operation of Embodiment 1 will be described. The cam chain chamber 57, which houses the drive sprocket 58 provided on the crankshaft 14 and a part of the cam chain 59 wound around the drive sprocket 58, is formed between the crankcase 25 and the electric-generator cover 53 in the engine main body 13. The balancer 93, which is rotated by the power transmitted from the crankshaft 14, is arranged in the cam chain chamber 57 at the position where the balancer 93 can splash the oil pooled in the lower portion inside the cam chain chamber 57. The wall portion 95, which is adjacent to the outer periphery of the balancer 93 in such a manner as to cover the balancer 93 at least from above, which is the wall portion 95 formed in the arcuate shape to cover the balancer 93 from above in Embodiment 1, is provided integrally on the left case half 30 of the crankcase 25 in the engine main body 13 in such a way as to be adjacent to the outer periphery of the balancer 93.

With this structure, the oil splashed by the rotation of the balancer 93 is caused to hit the wall portion 95 to be collected. Accordingly, the oil falls in drops from the wall portion 95, so that bubbles are unlikely to be generated in the oil. As a result, it is possible to make air unlikely to be mixed into the oil which is to be sucked in by the oil pump 76.

Furthermore, the cutout 96 for discharging a part of the oil pooled between the balancer 93 and the wall portion 95 to the side of the wall portion 95 is provided in the wall portion 95. Discharging a part of the oil pooled between the balancer 93 and the wall portion 95 to the side of the wall portion 95 can reduce the rotational friction of the balancer 93. In addition, the cutout 96 is arranged above the uppermost portion of the rotational trajectory RT of the outermost periphery of the balancer 93. This arrangement makes it possible to prevent the oil splashed by the balancer 93 from reaching directly the cutout 96 and then coming out to the side of the wall portion 95.

The crankcase 25 is formed of the right case half 29 and the left case half 30 fastened to each other with the plurality of bolts. At least one of these bolts, which is the one bolt 98 in Embodiment 1, is arranged in such a manner as to partially meet the cutout 96. Accordingly, the flexibility in the layout of the bolt 98 can be enhanced with the wall portion 95 not interfering with the layout of the bolt 98.

Moreover, the guide supporting portion 66 is formed integrally on the left case half 30 of the crankcase 25 at the side of the balancer 93. The wall portion 95 is formed integrally on the left case half 30 in such a manner as to be continuously connected to the guide supporting portion 66. Accordingly, the guide supporting portion 66 as well is provided with the function to collect the oil splashed by the balancer 93, whereby the effect of collecting oil can be enhanced.

Although the embodiment of the present invention has been described so far, the present invention is not limited to the above-described embodiment. Therefore, various modifications in design may be made without departing from the present invention described in the scope of claims.

EXPLANATION OF THE REFERENCE NUMERALS

13 ENGINE MAIN BODY
14 CRANKSHAFT
25 CRANKCASE
29 RIGHT CASE HALF
30 LEFT CASE HALF
31 MATCHING INTERFACE
58 DRIVE SPROCKET
59 CAM CHAIN
57 CAM CHAIN CHAMBER
65 CAM CHAIN GUIDE
66 GUIDE SUPPORTING PORTION
93 BALANCER
95 WALL PORTION
96 CUTOUT
98 BOLT
RT ROTATIONAL TRAJECTORY

We claim:

1. An internal combustion engine, comprising:
   a crankcase;
   a crankshaft rotatably supported in the crankcase, said crankshaft including a drive sprocket attached thereto;
   a cam chain engaging the drive sprocket;
   a cam chain chamber housing at least a part of the drive sprocket and cam chain therein, said cam chain chamber configured to pool oil in a lower portion thereof;
   a balancer coupled to the crankshaft and configured to be rotated by rotational power transmitted from the crankshaft, said balancer also being disposed within the cam chain chamber, said balancer being configured to splash oil pooled in the cam chain chamber during rotation thereof,
   wherein the engine also comprises a wall portion disposed in the cam chain chamber, said wall portion configured to cover an upper portion of the balancer, and is disposed adjacent to a periphery of the balancer,
   wherein the wall portion includes a cutout therein, said cutout configured to discharge oil between the balancer and the wall portion therethrough.

2. The internal combustion engine according to claim 1, wherein the cutout is disposed above an uppermost portion of a rotational trajectory of an outermost periphery of the balancer.

3. The internal combustion engine according to claim 1, wherein the crankcase comprises a pair of case halves connected to each other at a matching interface along a plane orthogonal to an axis of the crankshaft, and wherein at least one of a plurality of bolts fastening the case halves together are configured so as to partially meet the cutout.

4. The internal combustion engine according to claim 1, further comprising a guide supporting portion formed integrally on the crankcase adjacent a side of the balancer, wherein the guide supporting portion is recessed in a J shape into which an end portion of a cam chain guide, guiding the cam chain is supported, and
   wherein the wall portion is formed integrally on the crankcase so as to be continuously connected to the guide supporting portion.

5. An internal combustion engine, comprising:
   crankcase means for housing internal engine components;
   crankshaft means for providing rotational force to external devices, said crankshaft means rotatably supported in the crankcase, and including a drive sprocket attached thereto;
   cam chain means for engaging the drive sprocket;
   cam chain chamber means for housing at least a part of the drive sprocket and cam chain means therein, said cam chain chamber means configured to pool oil in a lower portion thereof;
   balancer means coupled to the crankshaft means, for receiving rotational power transmitted from the crankshaft means, said balancer means also being disposed within the cam chain chamber means, said balancer means also being configured to splash oil pooled in the cam chain chamber means during the rotation thereof;
   wherein the engine further comprises wall means disposed in the cam chain chamber means, said wall means for covering an upper portion of the balancer means, and being disposed adjacent a periphery of the balancer means,
   wherein the wall means includes a cutout therein, said cutout configured to discharge oil between means and the wall means therethrough.

6. An internal combustion engine according to claim 5, wherein the cutout is disposed above an uppermost portion of a rotational trajectory of an outermost periphery of the balancer means.

7. The internal combustion engine according to claim 5, wherein the crankcase means comprises a pair of case halves connected to each other at a matching interface along a plain orthogonal to an axis of the crankshaft means, and wherein at least one of a plurality of fastening means fastened the case halves together and are configured to partially meet the cutout.

8. The internal combustion engine according to claim 5, further comprising guide supporting means and cam chain guiding means for guiding the cam chain means, said the guide supporting means disposed on the crankcase means adjacent a side of the balancer means, wherein the guide supporting means is recessed in a J shape into which in an end portion of the cam chain guiding means is supported, and wherein the wall means is formed integrally on the crankcase means so as to be continuously connected to the guide supporting means.

9. A method of lubricating an internal combustion engine, said method comprising:
   providing a crankcase and a crankshaft rotatably supported in the crankcase, with the crankshaft including a drive sprocket attached thereto, and a cam chain chamber housing at least a part of the drive sprocket and a cam chain therein, wherein the cam chain chamber is configured to pool oil in a lower portion thereof;

providing a balancer coupled to the crankshaft, with the balancer being disposed within the cam chain chamber;

providing a wall portion disposed in the cam chain chamber, with the wall portion configured to cover an upper portion of the balancer, and wherein the wall portion is disposed adjacent to a periphery of the balancer;

rotating the balancer by rotational power transmitted from the crankshaft, such that the balancer splashes oil pooled in the cam chain chamber during the rotation thereof; and discharging oil through a cutout in the wall portion upon rotation of the balancer and upon splashing of the oil.

\* \* \* \* \*